Dec. 8, 1964     G. J. BOKUN     3,159,940
FISHING LURES
Filed Sept. 5, 1963
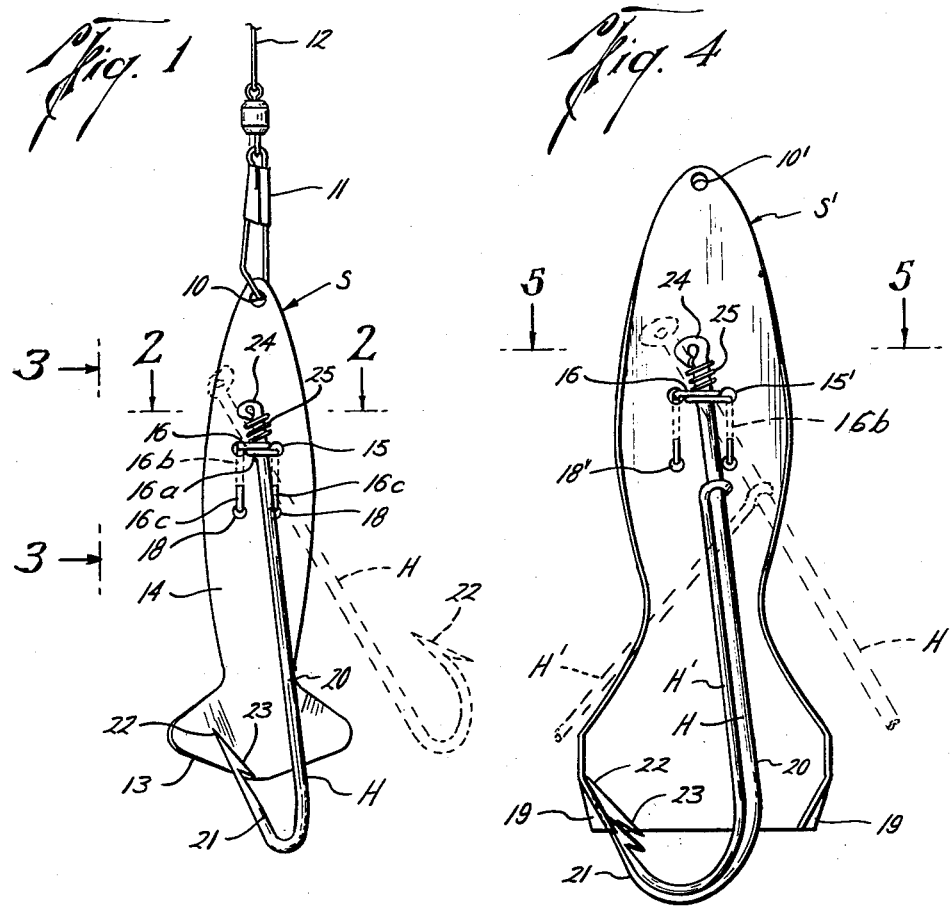
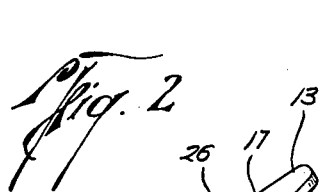
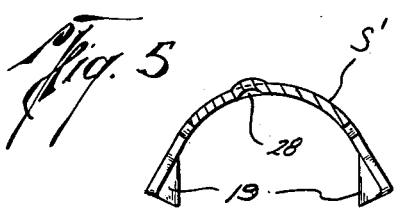
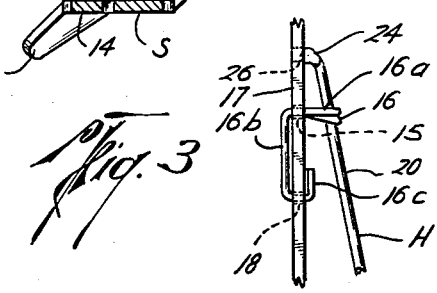
George Bokun
INVENTOR.
BY
ATTORNEYS

United States Patent Office 3,159,940
Patented Dec. 8, 1964

3,159,940
FISHING LURES
George J. Bokun, 2105 10th St., Lake Charles, La.
Filed Sept. 5, 1963, Ser. No. 306,922
5 Claims. (Cl. 43—35)

This invention relates to new and useful improvements in a fishing lure which maintains its hook in a shielded position to avoid fouling until the lure is struck by a fish to move the hook into a position to hook the fish.

Artificial lures are often used by sportsmen and other fishermen throughout the world in fishing for sport or game fish. Such lures, including plugs and spoons, are used either on the surface or below the surface of the water to deceive the fish to cause him to strike or bite the lure. When the fish does strike the lure, the fish is often hooked in or about the mouth by a hook attached or connected to the lure and the fish may be retrieved from the water. The dependability of the lure is related to the extent that the hook enters the mouth of the fish and is bitten, chewed or otherwise internally handled by the fish. Therefore, the hook should be exposed and positioned to set in the fish and should be free of impediments.

Fishermen in the past have cast or placed the lures in open waters which are relatively free of weeds, surface plants, logs, and other vegetation in an effort to prevent fouling of the hook in the growth and other debris in the water, and to also prevent loss of the lure and fishing line occasioned by snagging the hook on a heavy object. This limitation handicaps the fisherman because fish do not congregate in or frequent open waters to the extent that they do in weed filled waters. Open waters have little attraction for fish because the animal and insect life which provide their basic diet generally hide among weeds, plants, and other sheltering objects and rarely venture into open waters. The fish also tend to hide from natural enemies in such waters.

Weed and plant filled waters are difficult to fish with conventional lures, but a number of lures having protected hooks have been made available to sportsmen. As one example, a lure described in U.S. Patent No. 3,046,688, issued July 31, 1962, to A. E. Leisti, discloses a hook mounted on a spoon for rotation from a shielded position to a position for catching fish. While the Leisti lure provides a shielded position for the hook, the mounting bracket clamps the hook to the spoon to limit motion of the hook. The lure of this invention provides means urging the hook through multi-motion movement to effectively set the hook in the fish when the fish strikes the lure.

An object of this invention is to provide a new and improved fishing lure which shields the hook to prevent fouling and which releases the hook in a multi-motion movement to set the hook in the fish's mouth.

An important object of this invention is to provide a new and improved fishing lure, hook, and hook mounting mechanism which may be used with fishing spoons of various sizes and shapes.

Another object of this invention is to provide a new and improved fishing lure in which the point of the hook is shielded to prevent weed fouling of the hook, and yet the hook may be set in a fish's mouth when the fish strikes the lure.

Still a further object of this invention is to provide a new and improved fishing lure in which the point of the hook is rapidly spun and moved outwardly from the lure to set the point of the hook in the fish when the fish strikes the lure.

Yet another object of this invention is to provide a new and improved fishing lure which provides rotary and longitudinal motion which effectively sets the hook in the fish's mouth.

A further object of this invention is to provide a new and improved fishing lure which propels the point of the hook while in the fish's mouth when struck by a fish with such speed that the fish does not have time to spit out the lure.

Still another object of this invention is to provide a new and improved fishing lure in which the hook is shielded to prevent weed fouling of the hook, and the hook is spring-loaded to move longitudinally in the fish's mouth when the lure is struck.

Yet another object of this invention is to provide a new and improved fishing lure in which the hook is spring-loaded in a position safe from weed fouling by the natural resiliency of the hook itself.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation of the invention showing the set position of the hook in solid lines and a released position in dotted lines;

FIG. 2 is a sectional view of the spoon only taken along the line 2—2 of FIG. 1;

FIG. 3 is a view taken along the line 3—3 of FIG. 1 omitting the spring positioned on the shaft of the hook;

FIG. 4 is an elevation of a modified form of the invention showing two hooks in the set position in solid lines and in a released position in dotted lines; and FIG. 5 is a sectional view of the spoon only taken along the line 5—5 of FIG. 4.

Briefly, the letter S in the drawings designates a fishing spoon, and the letter H identifies a fishing hook. The hook H is shielded with the point positioned against the outer surface of the spoon S to prevent the hook H from fouling on weeds or snagging heavy objects. When the fish strikes the spoon S, the hook H rapidly rotates and moves longitudinally to a position exemplified by the dotted line position in the drawings so that the point is effectively set in the fish's mouth to hook the fish.

Considering the invention more in detail, the spoon S is shown in FIG. 1 with a hole 10 at its upper end for receiving a snap swivel 11 therethrough which may be attached to the fishing line 12. The form of the spoon S shown in FIG. 2 is flat and it has a pair of oppositely canted fins 13 at the lower end of the spoon S which tend to spin the spoon S as it moves or is pulled through the water. A pair of holes 15 is preferably located near the upper end of the spoon S, preferably on the vertical or longitudinal center line of the spoon. An eyelet or guide 16 is positioned in the holes 15 to extend forwardly of the face 14 of the spoon S. As shown in the drawings, the eyelet 16 is fabricated of wire which is wound in one or more loops to form an opening 16a with the ends thereof extending rearwardly through the holes 15. Such ends are bent to form a pair of legs or braces 16b adjacent the back side 17 of the spoon S which pass through a pair of holes 18 and are bent at 16c to anchor same to the spoon S.

The hook H has a longitudinal shaft 20, a shank 21, a point 22, and a barb 23. Both the shaft 20 and the shank 21 may lie in the same plane, but preferably they are offset as shown in FIG. 1. The upper end of the hook H is provided with an enlargement or eye 24 which is preferably bent forwardly toward the point 22 (FIG. 3). Of course, the opening of the eye is shown in the drawings even though it is not necessary to the invention, since the fishing line 12 is not connected to the hook. The shaft 20 of the hook H extends longitudinally through the guide 16 for longitudinal and rotational movement relative thereto upon a release of the hook H, as will be explained.

A small coil spring 25 is placed on the shaft 20 of the hook H between the hook eye 24 and the retaining guide 16 when the lure is assembled, as will be more evident hereinafter. A small hole 26 (see FIG. 2) is drilled in the spoon S in proximity to the holes 15 to receive the external curved surface of the hook eye 24 when the hook H is in the latched position (solid lines of FIG. 1).

The hook H is latched in the shielded position by manually or otherwise manipulating the shaft 20 to compress the spring 25 and position the curved portion of the enlargement 24 above the hole 26. Viewing the spoon S from the lower end, the hook H is rotated counter clockwise to engage the curved portion of the eye 24 with the opening 26 which is normally smaller in diameter than the curved portion of the eye 24. The hook H is then further rotated to position the shank 21 above the face 14 of the spoon S and parallel thereto. The shank 21 is contacted with the face 14 near the fin 13 or even adjacent to the fin 13. The actual point of contact may be varied by slightly altering the engagement of the hook eye 24 with the face 14 to lever the shank 21 toward the central portion of the lower end of the spoon S. Once the hook H is contacted to the spoon S, the hook H is latched in the position shown in FIG. 1 and further manipulation is unnecessary.

The latched or shielded position of the hook H results from the stressed equilibrium of the hook H created by the contact of the hook with the spoon S and the eyelet 16. Specifically, the enlargement 24 and the shank 21 contact the face 14 of the spoon S and the guide 16 contacts the shaft 20 to apply three static forces to the hook H. The forces maintain the hook in a static position for release as will be explained. It is to be noted that compression of the spring 25 does not aid in latching the hook, but rather, the natural or inherent resiliency of the hook H creates equal and opposite forces in the hook which position the hook statically.

While the use of the invention disclosed in FIG. 1 may be apparent from the foregoing, the fishing lure will be explained in operation to further amplify and expand. The spoon S is secured to a fishing line and the hook H is manipulated manually to the latched position as described above. The lure may be cast into clogged waters and retrieved without fouling the hook H on weeds, limbs, or other undesirable objects. When a fish strikes the lure, normally the fish will bite or seize the lure with his mouth with the same violence used to attack small animals or insects. In any event, the contact of the fish's mouth with the lure will dislodge the hook H from the latched position to catch the fish.

The fish will most often touch the hook H to create an additional force acting on the hook. The additional force will create stresses in the resilient hook H unbalancing the equilibrium of the hook to urge the shank 21 laterally across the face 14 of the spoon S. The stress in the hook H is relieved by the rapid movement of the hook as the shank 21 and point 22 rotate in a clockwise direction (as viewed from the lower end of the spoon S) upward and away from the face 14 for about 180° of revolution. Simultaneously, the shaft 20 is rotated relative the guide 16 to disengage the enlargement 24 from the opening 26 to terminate the contact therebetween. This permits the compressed spring 25 to act on the hook eye 24 to accelerate the upper end of the shaft 20 relative the guide 16 to impart longitudinal motion to the hook H. The longitudinal and rotational motion occur simultaneously to impart multi-motion movement to the hook which carries the point 22 in a generally helical path above the face 14 of the spoon S. The motion of the hook continues until the point 22 engages a penetratable object or until the shank 21 of the hook H rebounds against the guide 16 and stops at a final catching position as exemplified in dotted lines in FIG. 1.

FIGS. 4 and 5 are drawn to a curved or dished spoon S' to illustrate two of the possible variations of the invention. The hole 10' is drilled in one end to receive means securing the lure to a fishing line and a pair of fins 19 is placed on the opposite end to cause the lure to move irregularly when pulled through the water. The holes 15' and 18' receive the braces 16b which are bent at 16c to secure the guide 16 rigidly above the spoon S'. The hook may be similar or even identical to the hook H shown in FIG. 1 and has the shaft 20, shank 21, point 22, barb 23 and hook eye 24. The spring 25 is placed between the guide 16 and the eye 24 and compressed when the hook H is positioned as shown in FIG. 4. A dimple or indentation 28 is machined in the surface of the lure to receive and engage the eye 24 of the hook H when the spring 25 is compressed. As an optional feature, a second hook H' having a shorter shaft is placed on the hook H by sliding the eye of the hook H' over the point 22 of the hook H.

The hook H of FIG. 4 is placed in the latched position by the same manipulations used to latch the hook H in FIG. 1. The hook H is first pulled toward the lower end of the spoon S' and rotated counter clockwise (viewing the lower end of the lure) to engage the curved surface of the hook eye 24 with the indentation 28. Further counter clockwise rotation positions the shank 21 over the lower end of the spoon S' for contacting the face of the spoon S' to balance the hook H in static equilibrium using three points of contact as used in the configuration of FIG. 1. The hook H' is positioned with its eye on the shaft 20 of the hook H longitudinally below the contact of the guide 16 with said shaft. The shaft of the hook H is disposed parallel to the shaft 20 and the shank of the hook H' is placed between the shank 21 of the hook H and the face of the spoon S'. The hook H' may be lightly pressed against the spoon S' to wedge the point beneath the hook H to secure the hook H' from accidental release and to also make the hook H' more responsive to the motion of the hook H.

In operation, the lure of FIGS. 4 and 5 may be cast and fished as a normal lure without regard to objects in the water susceptible of fouling the hook. The lure will carry the hooks H and H' in the shielded position until a fish strikes the lure. The contact of the fish releases the hook H as previously discussed to simultaneously move longitudinally and rotatively relative the spoon S' in a generally helical path above the face thereof. The multi-motion movement of the point of the hook H continues until the point 22 penetrates the fish. The movement of the hook H dislodges the hook H' from the solid line position of FIG. 4 and imparts motion thereto to rotate and translate the hook H'. Generally, the point of the hook H' moves away from the spoon S' and toward the left side of the spoon S' as viewed in FIG. 4 while the point 22 of the hook H twists helically toward the right hand side of the spoon. Thus, the two points of the hooks H and H', considered together, travel paths which are very likely to engage the points of the hooks with or in the fish's mouth. As a matter of fact, both hooks often embed in the fish to reduce the likelihood that the fish may escape.

Certain modifications may be incorporated in the invention without departing therefrom. As shown in the drawings, the spoon may be flat or curved, and a second hook may be placed on the spring loaded hook. The spoons may be of any useable size and may be decorated with decals or other such markings. The spoon may be made from wood or metal of any thickness, and if it is very thick, it may resemble a plug. The hooks used in the lure may be of nearly any size including flat uniplanar hooks and those which have a lateral crook in the shank. Of course, the fishing lure may be used in fresh or salt water.

The foregoing disclosure and description of the invention is illustrative and explanatory thereof and various changes in the size, shape and materials, as well as in the details of the illustrated construction may be made within the scope of the appended claims without departing from the spirit of the invention.

What is claimed is:

1. A fishing lure and associated hook having a latched position and a catching position; comprising:
   (a) a fishing spoon having a face extending from the upper end thereof to the lower end thereof;
   (b) a fish hook having a shaft with a lower end and an upper end, and a point on the lower end of the shaft, the hook being positioned to contact the point against the face of the spoon near the lower end thereof, and to contact the upper end of the shaft against the face of the spoon near the upper end thereof;
   (c) a guide attached to the face a fixed distance thereabove, said guide in contact with the shaft of the hook to maintain the hook in a releasable latched position;
   (d) an enlargement on the upper end of the shaft;
   (e) means on the face of the spoon for releasably engaging the enlargement on the end of the shaft; and
   (f) spring means adapted to be positioned on the shaft of the hook between the guide and the enlargement for imparting longitudinal motion to said shaft on release from the latched position.

2. A fishing lure and associated hook having a latched position and a catching position, comprising:
   (a) a fishing spoon having a face extending from the upper end thereof to the lower end thereof;
   (b) a fish hook having a shaft with a lower end and an upper end, and a point at the lower end of the shaft, the hook being positioned to contact the point against the face of the spoon near the lower end thereof, and to contact the upper end of the shaft against the face of the spoon near the upper end thereof;
   (c) a guide attached to the face of the spoon in contact with the shaft of the hook to maintain the hook in a releasable latched position;
   (d) an enlargement on the upper end of the shaft;
   (e) means on the face of the spoon for receiving the enlargement on the end of the shaft; and
   (f) a spring disposed on the shaft of the hook between the guide and the enlargement for imparting longitudinal motion to said shaft on release from the latched position.

3. A fishing lure and associated hook having a latched position and a catching position, comprising:
   (a) a fishing lure having a face extending from the upper end thereof to the lower end thereof;
   (b) a fish hook having a shaft with the lower end and upper end, and a point carried by the lower end of the shaft, the hook being positioned to contact the lower end against the face of the lure and to contact the upper end of the shaft against the face of the lure near the upper end thereof;
   (c) there being means on the face of the fishing lure for engaging the upper end of the shaft of the hook;
   (d) guide means rigidly attached to the face of the lure and positioned a fixed distance thereabove, said guide means being adapted to contact the shaft of the hook; and
   (e) a spring disposed on the shaft of the hook between the guide and said means on the face of the fishing lure for imparting longitudinal motion to said shaft on release from the latched position.

4. A fishing lure and associated hook having a latched position and a catching position, comprising:
   (a) a fishing spoon having a face extending from the upper end thereof to the lower end thereof;
   (b) a fish hook having a shaft with a lower end and an upper end, and a point at the lower end of the shaft, the hook being positioned to contact the point against the face of the spoon near the lower end thereof, and to contact the upper end of the shaft against the face of the spoon near the upper end thereof;
   (c) a guide having an opening therein fixedly attached to the face of the spoon and positioned a fixed distance thereabove, said guide being adapted to receive the shaft of the hook therethrough to maintain the hook in a releasable latched position;
   (d) an eyelet on the upper end of the shaft;
   (e) means on the face of the spoon for engaging the eyelet on the upper end of the shaft; and
   (f) a coiled spring having an axial opening disposed on the shaft of the hook between the guide and the eyelet for imparting longitudinal motion to said shaft on release from the latched position.

5. The structure of claim 1, wherein a second hook having an eye is slidably engaged with the hook in contact with the guide.

References Cited by the Examiner

UNITED STATES PATENTS

| 1,769,083 | 7/30 | Tozier | 43—42.51 |
| 3,046,688 | 7/62 | Leisti | 43—35 |

FOREIGN PATENTS

| 550,819 | 12/57 | Canada. |
| 1,049,090 | 8/53 | France. |
| 1,085,713 | 7/54 | France. |

ABRAHAM G. STONE, *Primary Examiner.*